Nov. 29, 1960 R. O. ENDRES 2,962,699

MEMORY SYSTEMS

Filed Dec. 1, 1954 3 Sheets-Sheet 1

INVENTOR.
RICHARD O. ENDRES
BY Morris A. Rabkin
ATTORNEY

Nov. 29, 1960 R. O. ENDRES 2,962,699

MEMORY SYSTEMS

Filed Dec. 1, 1954 3 Sheets-Sheet 2

INVENTOR.
RICHARD O. ENDRES
BY Morrison Rabkin
ATTORNEY

Nov. 29, 1960 R. O. ENDRES 2,962,699

MEMORY SYSTEMS

Filed Dec. 1, 1954 3 Sheets-Sheet 3

INVENTOR.
RICHARD O. ENDRES
BY Morris A. Rabkin
ATTORNEY

United States Patent Office 2,962,699

Patented Nov. 29, 1960

2,962,699

MEMORY SYSTEMS

Richard O. Endres, Collingswood, N.J., assignor to Radio Corporation of America, a corporation of Delaware Filed Dec. 1, 1954, Ser. No. 472,292

21 Claims. (Cl. 340—174)

This invention relates to memory systems, and particularly to improved methods of and means for writing information into and reading information out of such systems.

Random access memories employing arrays of binary cells for storing information are known. One such system provides a memory system with a storage capacity of $N^2$ binary words of "*m*" binary digits each. This memory system includes a three-dimensional array of magnetic cores comprising "*m*" two-dimensional memory planes arranged in parallel with one another. Each memory plane contains $N^2$ memory cores. Each binary digit of a word is stored in a similar position in a respective one of the memory planes.

Access to a given memory position is obtained by means of a magnetic switch having $N^2$ switch cores. An individual access wire couples each switch core to a group "*m*" of the memory cores. The magnetic switch is driven by two N vacuum tube or transistor amplifiers. Also, a switch having $N^2$ switch cores can be driven by two similar, cascaded switches each of which contains N switch cores and each of which is driven by $2\sqrt{N}$ vacuum tube or transistor amplifiers. Each of the memory cores in a memory plane has a digit plane winding coupled thereto. A separate amplifier is associated with each of the digit plane windings. It is apparent that a more reliable and a more economical memory system can be obtained by reducing the number of driving means required.

A binary word can be written into a given memory position by selecting the one switch core which is coupled to the memory cores at the given position. An inhibit current is simultaneously applied to the digit plane winding of those planes in which it is desired to write a binary one in the given position. No inhibit current is applied to the digit plane winding of those planes in which it is desired to write a binary zero in the given position. Information can be read out of a given memory position by exciting the coupled switch core and observing the voltage induced in the respective digit plane windings. The presence or absence of a voltage induced in the respective digit plane windings is indicative of the condition of the memory cores being read. An undesired noise voltage is induced by the half-amplitude excitation currents in the access wires which are coupled to the switch cores which are linked by the addressed row and column windings of the switch. These undesired noise voltages, in turn, partially excite the memory cores which are coupled to these access wires. In case of a large capacity memory, the cumulative effect of the output voltages caused by the partially excited memory cores can conceivably cause an ambiguity in the output signal.

It is an object of the present invention to provide an improved, large capacity memory system requiring a reduced number of excitation means.

Another object of the present invention is to provide a large capacity memory system wherein the mechanical complexity is reduced by a substantial factor by means of the present invention.

Still another object of the present invention is to provide a novel magnetic memory system and apparatus for writing information into and reading information out of such a system.

Yet another object of the present invention is to provide an improved method of and means for reducing the noise output of a memory system.

The above and further objects of the present invention are carried out by providing a three-dimensional array of "*m*" groups of two-dimensional arrays, each two-dimensional array having a plurality of storage elements. Each group is assigned one binary digit of a word. Logic circuitry is provided for selecting one two-dimensional array out of each group. A switch means having a suitable number of switch elements is provided. Information may be written into and read out of the system by operating the switch to fully select every storage element at a desired memory position. Because each of the "*m*" groups may contain a number "*p*" of the two-dimensional arrays, then the selected storage element in $(p-1)$ arrays of each group is concurrently selected to have an inhibit pulse applied thereto. These inhibit pulses assure interrogation of a single storage element at the desired memory position in each of the "*m*" groups. The memory system of the present invention can be made to resemble a cubicle array which is the storage configuration offering optimum storage economy.

The noise output of the memory system of the present invention is reduced by arranging the excitation pulses such that a first pulse begins before and terminates after a second pulse. Thus, the partial excitations produced in the non-selected storage elements by the leading and trailing edges of the first pulse do not appear during the read-out time interval. Another advantage of thus applying the excitation pulses includes the fact that the requirements of the switching circuits are less stringent because it is not necessary to have two short duration pulses substantially coincident. Still another advantage resulting from the different duration pulses is that the leading and trailing edges of the long duration pulse can have a relatively slow rise and fall time with consequent power savings. Other aspects of the present invention include means for reducing the number of wires which are threaded through the respective storage elements, and an improved magnetic means for writing information into and reading information out of the selected element of a group of arrays.

The novel features of this invention, as well as the invention itself, both as to its organization and method of operation, will best be understood from the following detailed description when read in connection with the accompanying drawing in which like reference numerals refer to the same parts and wherein.

Figure 5:
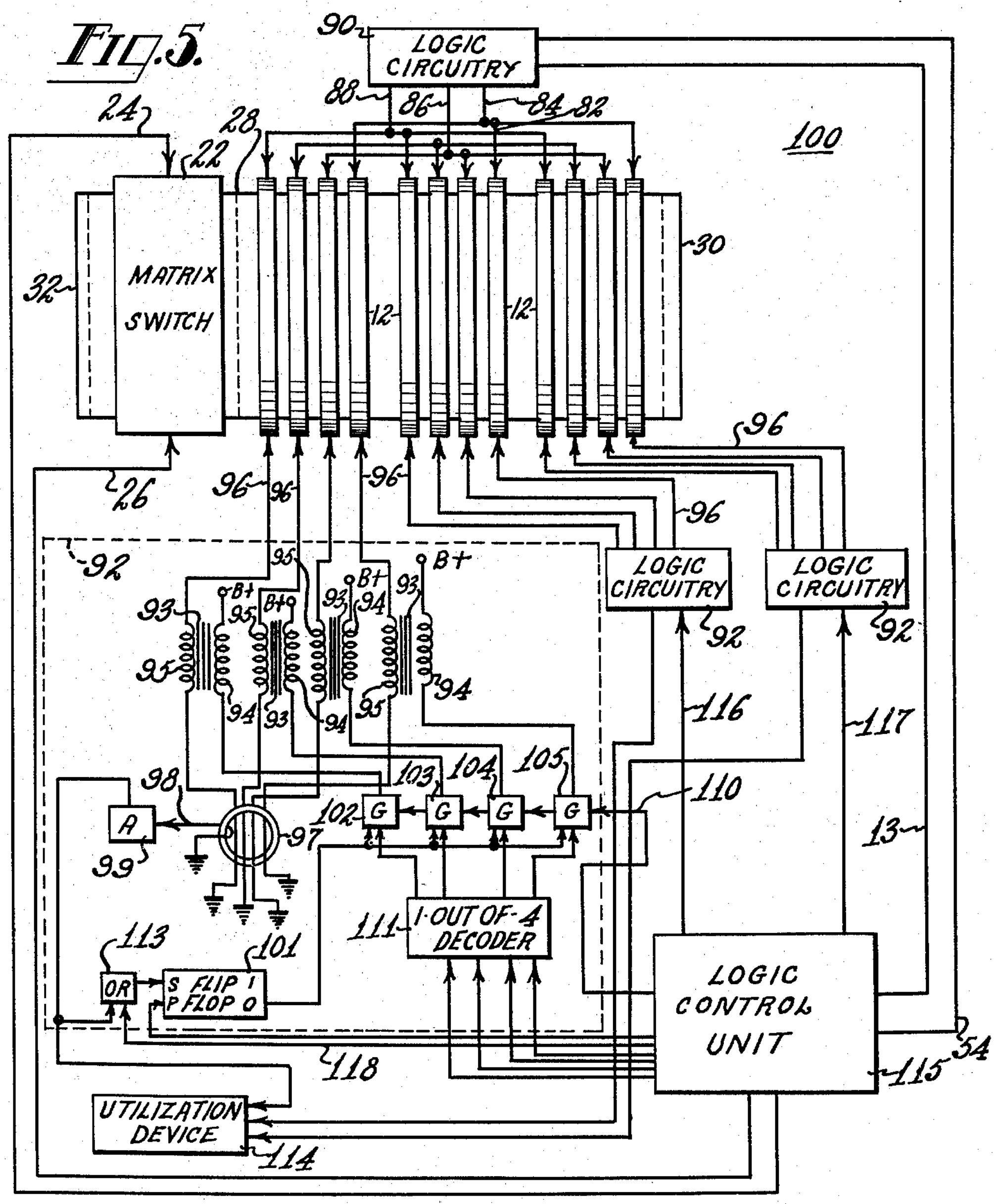
Figure 6:
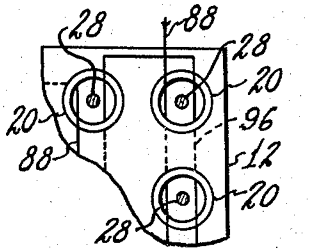

Fig. 5 is a schematic diagram of a memory system illustrating a means for combining the write and the read-out windings into a single winding, and means for restoring the information read-out of a selected storage element, and Fig. 6 is a detailed view, somewhat enlarged, of the upper right-hand corner of one of the memory planes of Fig. 5, and shows the manner of coupling the excitation windings to the storage elements.

Figure 1:
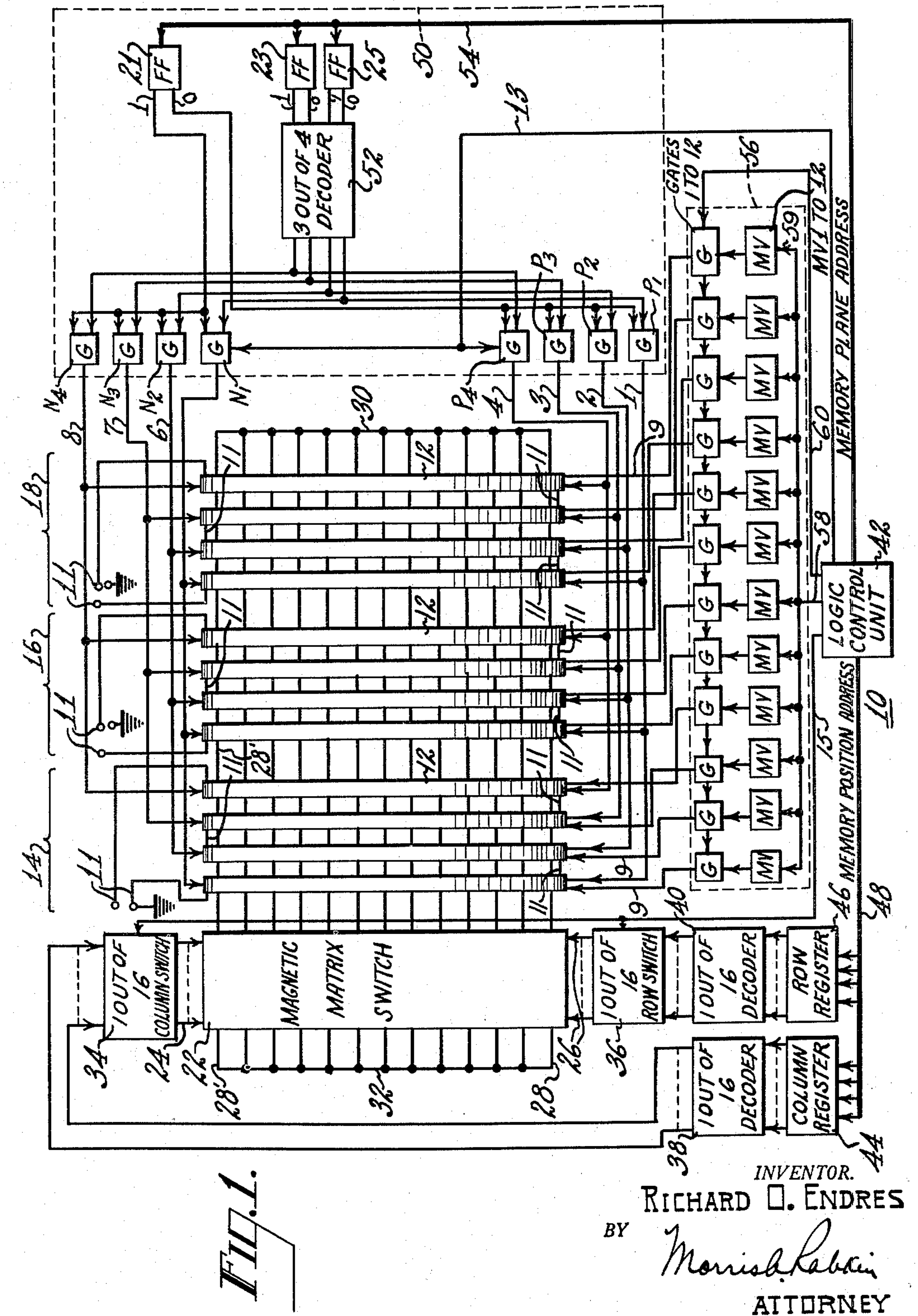
Fig. 1 is a schematic diagram of a three-dimensional memory system according to the present invention with the two-dimensional memory planes being shown in end view.

Although the invention is illustrated herein by the use of magnetic cores, it is to be understood that other bistable storage elements may be employed. Referring to Fig. 1, the three-dimensional memory system comprises a plurality of groups of two-dimensional memory planes 12 arranged physically parallel to one another. For the purpose of the present description, three different groups 14, 16, and 18 of the memory planes 12 are shown. Each of the groups is assigned one binary digit of a word. Each memory plane 12 contains a 16 x 16 matrix of magnetic cores 20 (Fig. 2) arranged in rows and columns. Other arrays may be employed, if desired. Thus, each plane has provision for storing 256 different binary digits and each group of the memory planes 12 provides for the storage of 1024 binary digits. The memory system of Fig. 2, therefore, has a capacity of 1024 different binary words each having three binary digits. A magnetic matrix switch 22 termed an "end switch" is provided.

The end switch 22 may be similar to that described in a copending application, Serial No. 375,470, entitled "Memory System," filed by Jan A. Rajchman and Richard O. Endres, August 20, 1953, now Patent No. 2,784,391 of March 5, 1957. Briefly, the end switch 22 comprises an array of magnetic switch cores arranged in rows and columns and corresponds to the arrangement of the memory cores 20 of the memory planes 12. Each of the switch cores is linked by a row winding 26, a column winding 24, a bias winding (not shown), and an output winding. The output winding of a switch core is termed herein a switch winding 28. Each switch winding 28 is threaded through a corresponding one of the memory cores of each of the memory planes 12. The switch windings 28 are shorted together at the memory end of the system by means of a common connection 30 and are shorted together at the switch end of the system by means of a common connection 32. An individual differentiating resistance (not shown) may be connected in series with each switch winding. Alternatively, each switch winding 28 may be comprised of high resistance wire such as Nichrome wire. Each of the row windings 26 of the switch 22 is connected to one of sixteen different outputs of a row switch 36. Each of the column windings 24 is connected to a different one of the sixteen outputs of a column switch 34. Both the row switch 36 and the column switch 34 may be comprised of sixteen different driver tubes. Each of the driver tubes has a first and a second control grid. The first control grid of each of the drivers of the row switch 36 is connected to a different one of sixteen outputs of a row decoder 40. The first control grid of each of the driver tubes of the column switch 34 is connected to a different one of sixteen outputs of a column decoder 38. Both the decoder 38 and the decoder 40 may be comprised of a rectifier matrix which operates to raise the voltage level on a particular one of sixteen outputs in accordance with four different binary inputs. This type of decoder is described in Chaper 4 of "High Speed Computing Devices," by Engineering Research Associates, published by McGraw Hill Bock Company in 1952. The second control grid of each of the driver tubes of the row switch 36 and the column switch 34 is connected, in parallel, via the trunk line 15 to one output of a logic control unit 42. The trunk line 15 and the remaining trunk lines referred to hereinafter are shown in the drawing as a single line in order to simplify the drawing. It is understood that each trunk line contains a plurality of leads. The four binary inputs (comprising eight different input leads) of the column decoder 38 are, respectively, connected to one of the four binary outputs of a column register 44. The four binary inputs of the row decoder 40 are, respectively, connected to one of the four binary outputs of a row register 46. Both the column register 44 and the row register 46 may be comprised of four different flip-flops, each having a set and a reset input, and a "0" and a "1" output. The flip-flops are normally in the reset condition with the "0" output at a relatively high voltage level. When a pulse is applied to a set input, a flip-flop alters its state and furnishes a relatively high voltage level on the "1" output. Each of the set inputs of the column register 44 and the row register 46 is connected via one of the eight different leads of a trunk line 48 to a different one of eight outputs of the logic control unit 42. The four set inputs of the column register 44 may be assigned, respectively, to a corresponding one of the four binary digits $2^0$ through $2^3$. The four set inputs of the row register 46, then, may be assigned, respectively, to a corresponding one of the four binary digits $2^4$ through $2^7$.

A particular one of each group of memory planes 12 is selected by means of the logic circuitry enclosed by the dotted line 50. The logic circuitry 50 includes a first set of three-input, inhibit gates $P_1$ through $P_4$ and a second set of inhibit gates $N_1$ through $N_4$. Each individual gate is shown in the drawing as a rectangle with the letter "G" inscribed. The outputs of the corresponding one of the "P" and "N" gates are similarly linked to all the memory cores 20 of one memory plane of each group. Therefore, only the connection of the "P" gates in the system is described. The output of the gate $P_1$ is linked to every memory core 20 of the first one of each group of the memory planes 12 by means of a winding 1. The output of the $P_2$ gate is linked to every core of a second one of each group of the memory planes 12 by means of a winding 2. The output of the $P_3$ gate is linked to every core of a third one of each group of the memory planes by means of a winding 3. The output of the $P_4$ gate is linked to every core of the fourth memory plane 12 of each group of the memory planes by means of a winding 4. The windings 5, 6, 7, and 8 of the respective "N" gates are linked to a respective one of the arrays 12 of each group. Each of the "P" and "N" inhibit gates may be comprised of a three-input "and" gate. One input of each of the "P" gates and a corresponding one of the "N" gates is connected to a respective one of the four outputs of the memory plane decoder 52. The decoder 52 may be a rectifier matrix operating to raise the voltage level on three of its four different outputs in accordance with two binary inputs. The second input of each of the "P" gates is connected to the "0" output of a flip-flop 21. In the drawing, a flip-flop is shown as a rectangle with the legend "FF" inscribed. The second input of each of the "N" gates is connected to the "1" output of the flip-flop 21. One of the binary inputs of the decoder 52 is connected to the "0" and the "1" outputs of a flip-flop 23 and the other of the binary inputs is connected to the "0" and the "1" outputs of a flip-flop 25. The set inputs of the flip-flops 21, 23, and 25 are, respectively, connected to one of the three leads of a trunk line 54. Each lead of the trunk line 54 is connected to a different one of three outputs of the logic control unit 42. The two leads of the trunk line 54 which are connected to the flip-flops 23 and 25 may be assigned a respective one of the binary digits $2^8$ and $2^9$.

Information is written into a selected memory core 20 of a given one of the memory planes 12 by means of the additional logic circuitry enclosed by the dotted line 56. This circuitry includes twelve different two-input "and" gates $G_1$ through $G_{12}$ and twelve different multivibrators $MV_1$ through $MV_{12}$. Each multivibrator is shown as a rectangle with the legend "MV" inscribed. One of the inputs of each of the gates $G_1$ through $G_{12}$ is connected to the "1" output of a corresponding one of the multivibrators $MV_1$ through $MV_{12}$. Each of the multivibrators has a set and a reset input, and a "1" and a "0" output. A respective one of the set inputs is connected to one of the twelve different leads of a trunk line 58. The respective leads of the trunk line 58 are connected to one of twelve different outputs of the logic control unit 42. The second input of each of the gates $G_1$ through $G_{12}$ is connected to one terminal of a conductor 60. The other terminal of the conductor 60 is connected to an output of the logic control unit 42. The logic control unit 42 may be any device, for example, a digital computer, which is arranged to furnish the pulse programs described hereinafter in connection with Fig. 3. The output of the gate $G_1$ is linked to every memory core 20 of the first of the memory planes 12 of the first group 14 by means of a write winding 9. The output of the gate $G_2$ is linked to every memory core 20 of the second memory plane 12 of the first group 14 by means of a similar write winding 9. The remaining gates $G_3$ through $G_{12}$ are similarly connected to all the cores 20 of a corresponding one of the memory planes 12 by means of an individual one of the write windings 9. A read-out winding 11 is linked to every memory core 20 of one of the groups of the memory planes 12. Thus, there are three different, read-out windings 11 which may be connected to any suitable utilization device which is responsive to an output voltage induced in a read-out winding when a selected memory core of a given one of the memory planes 12 is excited from one of its stable states to the other. It is understood that the embodiment of the memory system of Fig. 1 and the further embodiments described herein are provided with a common ground which is illustrated in the drawing by the conventional ground symbol.

Figure 2:
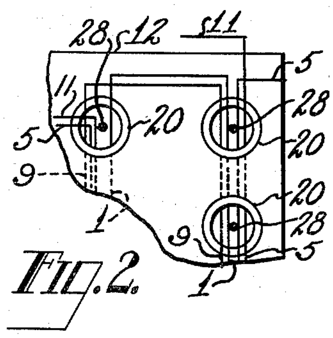
Fig. 2 is a detailed view, somewhat enlarged, of the upper right-hand corner of the first one of the memory planes of the group 14 of Fig. 1, and shows the manner of coupling the excitation windings to the storage elements.

Fig. 2 is a detailed elevational view, somewhat enlarged, of the upper right-hand corner of the first memory plane of the group 14 and illustrates the windings in the various memory cores 20. The individual switch windings 28 are shown in cross-section. Each of the individual windings 1, 5, 9 and 11 is threaded in the same sense through each of the memory cores 20. The sense of any given winding reverses in every other memory core 20 in the known checkerboard fashion.

The operation of the memory system of Fig. 1 is described in connection with the waveforms shown in Fig. 3. The amplitude of the positive pulse 62 and the negative pulse 64 of the waveform 61 is represented as being equal to one unit. One unit of current is sufficient to generate a magnetizing force equal to or greater than a threshold value at which a memory core in one of its stable states changes to the other of its stable states. Each of the inhibit pulses of the waveforms 65, 67, and 69 has an amplitude of at least one-half unit but less than a full unit. In the following description of the operation, the pulses will be designated as switch and inhibit pulses and it is to be understood that a switch pulse has one unit of amplitude and an inhibit pulse has one-half unit of amplitude. The waveform 61 is furnished each time a switch core of the switch 22 is operated. The waveform 65 is furnished by each of the "N" gates. The waveform 67 is furnished by each of the "G" gates, and the waveform 69 is furnished by each of the "P" gates.

Assume that it is desired to write the binary word 101 into the memory core 20 located at the upper right-hand corner of the first (extreme left-hand one as viewed in the drawing) memory plane 12 of the respective groups 14, 16, and 18. The switch winding 28' is coupled to every memory core 20 located in the upper right-hand corner of each array 12. The 1024 memory word positions are determined by ten different binary inputs which are furnished by the logic control unit 42. Four of the binary inputs are applied individually to the set input of a respective one of the four flip-flops of the column register 44. Each of the flip-flops of the memory system of Fig. 1 and the memory system of Fig. 5 is reset after each write and read-restore cycle. Another four of the binary inputs are individually applied to the set input of a respective one of the four flip-flops of the row register 46. The remaining two binary inputs are individually applied to the set input of a respective one of the flip-flops 23 and 25. During the write operation, a signal is applied by the logical control unit 42 to the set input of the flip-flop 21 raising the voltage level of the "1" output. The logic control unit 42 also applies a signal to the set input of the multivibrators $MV_1$ and $MV_9$. The sixteen outputs of the column register 44 are decoded by the decoder 38, raising the voltage level on the output line corresponding to the sixteenth column. The corresponding one of the column driver tubes of the column switch 34 whose anode is coupled to the switch cores of the sixteenth column of the switch 22 is primed. The sixteen outputs of the row register 46 are decoded by the decoder 40 to prime the one row driver tube of the row switch 36 which is coupled to the switch cores of the first row of the switch 22. The outputs of the flip-flops 23 and 25 are decoded by the decoder 52 to raise the voltage level on the three output leads which are connected to the gates $P_2$, $N_2$; $P_3$, $N_3$; and $P_4$, $N_4$, respectively. The "1" output of the flip-flop 21 is applied to the second input of each of the "N" gates thereby priming these gates for operation. After the memory address has been set up in the various registers, the logic control unit 42 supplies an operating signal to the "P" and "N" gates. The primed gates $N_2$, $N_3$, and $N_4$ are rendered conducting and each furnishes the negative inhibit pulse 66 to the respective windings 6, 7 and 8. At a time $t$, after the operating signal is applied to the "N" gates and while the inhibit pulse 66 is at a steady amplitude, the logic control unit 42 applies an operating signal to each of the driver tubes of the column switch 34 and the row switch 36. The one primed driver tube in both the column and row switches conducts, thereby driving the switch core, which is coupled to the switch winding 28' from the one direction of saturation to the other. When the switch core is thus driven, a positive current pulse 62 of the waveform 61 flows in the winding 28'. The pulse 62 drives the coupled memory core 20 of the first memory plane 12 in each of the groups to the P state of saturation. The coupled memory core 20 in the remaining planes in each group are not changed by the switch pulse 62 because of the presence of the negative, inhibit pulse 66. The time interval $t_1$ of the switch pulse 62 is sufficient to switch a memory core from the state "N" to the state "P." At a time $t_2$, after the termination of the positive switch pulse 62, the inhibit pulse 66 is terminated due to the removal of the operating signal from the "P" and the "N" gates. The logic control unit 42 then applies a reset signal to the flip-flop 21 raising the voltage level of its "0" output thereby priming the gates $P_2$, $N_2$; $P_3$, $N_3$; and $P_4$, $N_4$. At a time $t_3$, after the termination of the negative inhibit pulse 66, the logic control unit 42 furnishes an operating signal to the "P" gates and to the "G" gates. The primed "P" gates $P_2$, $P_3$, and $P_4$ are rendered conducting, and furnish the positive inhibit pulse 70 to the respective windings 2, 3, and 4. The primed "G" gates $G_1$ and $G_9$ are rendered conducting and furnish the positive inhibit pulse 68 to the two different write windings 9 which are coupled to all the memory cores 20 of the first one of the memory planes 12 in the respective groups 14 and 18. At a time $t_4$, after the initiation of the positive, inhibit pulse 68, the operating signal applied to the driver tubes of the column switch 34 and the row switch 36 is removed. The bias potential of the matrix switch 22 returns the excited switch core to the one direction of saturation thereby causing the negative pulse 64 to flow in the coupled switch winding 28'. This pulse has a duration $t_5$ sufficient to return the coupled memory core 20 of the first one of the memory planes 12 of the group 16 from the state "P" to the state "N" thereby writing a binary zero into this memory core. The positive inhibit pulse 70 prevents the switch pulse 64 from returning the coupled memory cores 20 of the first of the memory planes 12 of the groups 14 and 18 back to the state N. Therefore, a binary one is written into the desired memory core 20 in the first one of the memory planes 12 of the groups 14 and 18. The positive inhibit pulse 70 prevents the switch pulse 64 from exciting the coupled memory cores 20 in the remaining three planes of the groups to the state N. At a time $t_6$ after the switch pulse 64 is terminated, the inhibit pulses 68 and 70 are terminated. Thus the binary word 101 is written into the three memory cores 20 in the first arrays 12 of the respective groups 14, 16, and 18.

Information stored in a given memory position can be read out in a manner similar to the write operation just described. For example, three of the four memory planes of a group are inhibited by operating three of the "N" gates. During the interval when the pulse 62 is flowing in the coupled switch winding 28, the selected memory core 20 in the one memory plane in each group is driven towards the "P" direction of saturation by the switch pulse 62. When a binary "0" is stored in a driven memory core, the relatively large amplitude, voltage pulse 72 of the waveform 73 is induced in the output winding 11 which links all the memory cores 20 in the group of memory planes 12. When a binary "1" is stored in the driven memory core, the relatively small amplitude voltage pulse 74 of the waveform 75 is induced in the output winding 11. The pulse 74 may have an amplitude which is substantially equal to zero because the inhibit pulse 66 does not contribute any noise voltage on the output winding 11 during the presence of the switch pulse 62. Thus, by arranging the inhibit pulse 66 to commence before and terminate after the switch pulse 62, the noise voltages induced in the output winding 11 by the leading edge of the pulse 66 die out before and the noise voltages contributed by the trailing edge of the pulse 66 do not begin until after the given memory core of a group has been interrogated. Therefore, it is relatively simple to arrange the utilization device to discriminate between the output signal 72 and the absence of an output signal represented by the pulse 74. Special strobing techniques may be dispensed with, if desired, because of the improved signal-to-noise ratio thus obtained.

The information read out may be restored by additional circuitry which is responsive to the pulse 74 for generating the positive, inhibit pulse 70 thereby preventing the negative switch pulse 64 from changing the state of the driven memory core 20. The restoration circuitry responds to the pulse 72 by preventing the inhibit pulse 70 from being generated and, therefore, the negative, switch pulse 74 returns the driven core back to the state N.

During the read or write operation there are only two different excitations applied to a memory core 20 at any one time and, theoretically, a memory system can be provided in which the number of windings which link any one of the memory cores 20 is reduced to a minimum of two. However, because of the increased complexity of a system having only two windings linked to any one memory core 20, the further embodiments of the present invention provide three different windings. One winding is the switch winding 28, a second winding is used for applying either a positive or a negative, inhibit pulse to the memory core 20 of the three non-selected planes of each group, and a third winding is used both as a read-out winding and as a means for applying the positive, inhibit current to the driven memory core 20 of the selected plane.

Figure 4:
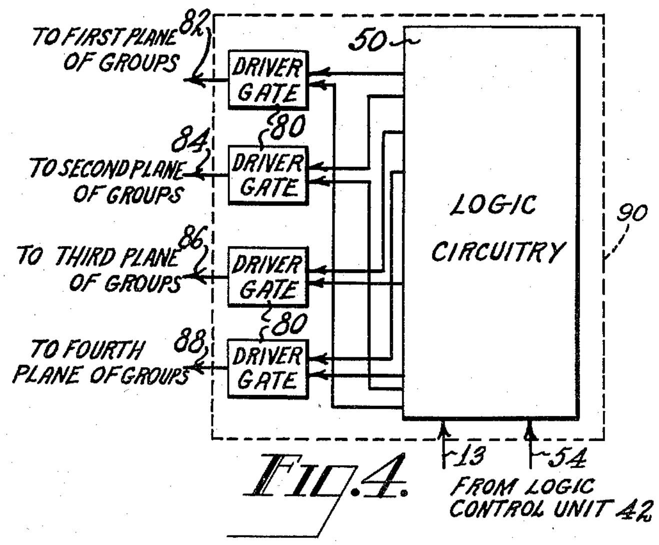
Fig. 4 is a schematic diagram of an arrangement whereby one P inhibit winding and one N inhibit winding are combined into a single inhibit winding.

The circuitry enclosed by the dotted line 90 of Fig. 4 may be used for combining the two different inhibit windings into a single winding. The logic circuitry 50 is the same as that of Fig. 1. Each of the driver gates 80 may be comprised of a pair of vacuum tubes, each pair being connected in push-pull across the primary of a pulse transformer (not shown). The control grid of one driver tube of a first pair is connected to the output of the $N_4$ gate and the control grid of the other tube of this pair is connected to the output of the $P_4$ gate. The control grid of a first tube of a second pair is connected to the output of the $N_3$ gate and the other control grid of this pair is connected to the output of the $P_3$ gate, and so on, the output of a corresponding "N" and "P" gate being connected to one of the control grids of the pair of tubes of one of the driver gates 80. When an "N" gate is operated, one driver tube of a pair is operated and the negative pulse 66 is furnished at the secondary of the pulse transformer. One terminal of the secondary winding may be connected to the common ground, and the other terminal is connected to one of the windings 82, 84, 86 and 88. When a "P" gate is operated, the other driver tube of a pair is operated and the pulse 70 is furnished at the secondary of the pulse transformer. The winding 82 is linked to every memory core 20 of the first array 12 of each group. The winding 84 is linked to every memory core 20 of the second array 12 of each group. The windings 86 and 88 are linked, respectively, to the memory cores 20 of the third and fourth arrays 12 of each group.

The operation of the memory system using the logic circuitry 90 is substantially the same as that described in connection with Fig. 1. Thus, at the initiation of the write operation, three out of four of the "N" gates are operated, and a negative, inhibit pulse 66 is furnished to three of the four windings 82 through 88 by the three operated driver gates 80. At a time $t_3$, after the termination of the pulses 66, three out of four of the "P" gates are operated by a signal furnished by the logic control unit 42 on the lead 13 and the positive, inhibit pulse 70 is furnished on three different ones of the four windings 82 through 88 by the operated tubes of the driver gates 80.

In the memory system 100 of Fig. 5, there are but three windings linked to every memory core 20 (Fig. 6). The read-out winding 11 and the four individual, inhibit windings 9 for each group of the arrays 12 of Fig. 1 are combined into four different read-write windings 96. It will be recalled that in the embodiment of Fig. 1, a single read-out winding 11 is linked to every memory core 20 of a group of the arrays 12. However, it may be more desirable to provide a separate read-out winding for each array 12 of a group and combine the four, different outputs of a group into a single output by means of an "or" gate. The individual read-write windings 96, then, have less distributed capacitance and, consequently, the output pulse of an interrogated memory core is more sharply defined. The logic circuitry 92 provides a means for combining the functions of each two of the windings 11 and 9 of each array 12 into a single read-write winding 96. For convenience of drawing, only the logic circuitry 92 for the first group 14 of the arrays 12 is shown in detail. The logic circuitry 92 for each of the groups 16 and 18 is similar to that of the group 14.

The logic circuitry 90, described in connection with Fig. 4, is used to furnish the positive and negative inhibit pulses to each of the three non-selected planes of a group. The inhibit winding 88 links every memory core 20 in the first plane 12 in each group. Similarly, the inhibit windings 86, 84 and 82 respectively link all the memory cores 20 in the second, the third, and the fourth plane 12 of each group. The matrix switch 22 is the same as that described in Fig. 1 and furnishes the waveform 61 on a selected one of the switch windings 28.

Fig. 6 shows the arrangement of the inhibit winding 88, the read-write winding 96, and the switch windings 28 in three memory cores 20 of the upper right-hand corner of the first memory plane 12 of the group 14. The switch windings 28 are shown in cross-section in the respective memory cores 20.

Each logic circuit 92 includes four different pulse transformers 93 each having a primary winding 94 and a secondary winding 95. One terminal of the secondary winding 95 is connected to an individual one of the read-write windings 96. The other terminal of the secondary winding 95 is connected to one of the inputs of a four-input "or" gate 97. The "or" gate 97 may be comprised of a magnetic core having a linear magnetization characteristic. The output winding 98 of the "or" gate 97 has one terminal connected to ground, and the other terminal connected to the control grid of a triode amplifier 99. The amplifier 99 is connected in a conventional arrangement to an electronic power supply. The output of the amplifier 99 is connected to one of the inputs of a two input "or" gate 113, and to one of the inputs of a utilization device 114. The output of the "or" gate 113 is connected to the set input of a restore flip-flop 101. The reset input of the flip-flop 101 is connected to the logic control unit 115. The logic control unit 115 may be similar to the logic control unit 42 with the exception that the row and column switches, the decoders, and the registers for operating the matrix switch 22 are incorporated therein. The second input of the "or" gate 113 is connected to another output of the logic control unit 115. One terminal of the primary winding 94 of each of the transformers 93 is connected to the B+ terminal of a direct current power supply. The other terminal is connected to the output of a respective one of the three-input write gates 102, 103, 104 and 105. The "0" output of the flip-flop 101 is connected to an input of each of the write gates. A second input of each of the write gates is connected via the lead 110 to an output of the logic control unit 115. A one-out-of-four decoder 111 is provided. A respective one of the outputs of the decoder 111 is connected to the third input of an individual one of the write gates. The two binary inputs of the decoder 111 are connected to two binary outputs of the logic control unit 115. The trunk lines 116 and 117 furnish the operating signals for the logic circuitry 92 associated with the second group 16 of the arrays 12 and the third group 18 of the arrays 12.

Figure 3:
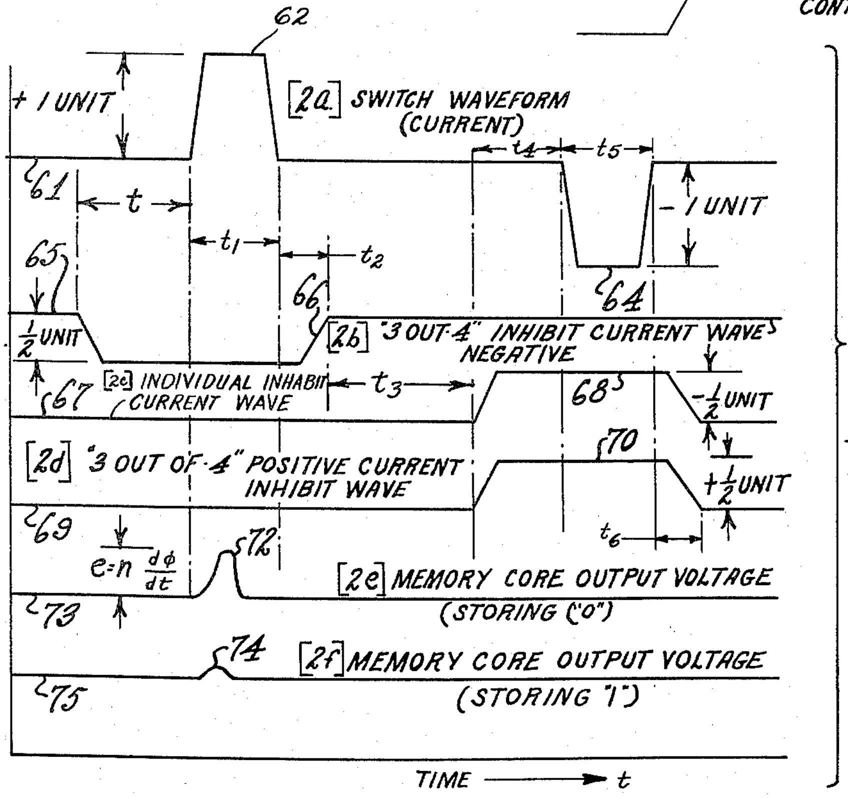
Fig. 3 is a graph of waveforms useful in explaining the operation of the memory system of Fig. 1.

The operation of the memory system 100, using the waveforms of Fig. 3, is as follows: Assume that it is desired to wire a binary one into a memory core 20 located at the upper right-hand corner of the first array 12 of the group 14. The address of the selected memory core 20 is staticized by the logic control unit 115 in the respective registers of the logic circuitry 90 and the registers associated with the matrix switch 22. An operating signal is applied to the winding 13. The three driver gates of the logic circuitry 90 are operated and furnish the negative, inhibit pulse 66 on the leads 82, 84, and 86. At a time *t*, the matrix switch 22 is operated, and the one selected switch core causes the pulse 62 to flow in its coupled switch winding 28. The coupled memory core of the first array of the group 14 is driven to the state "P" by the pulse 62. The pulse 66 is terminated at a time $t_2$ after the switch pulse 62 returns to zero amplitude. At a time $t_3$ after the termination of the pulse 66, the logic control unit 115 furnishes a second operating signal on the lead 13. The three driver gates of the logic circuitry 90 are again operated and furnish the positive, inhibit pulse 70 on the three windings 82, 84, and 86. The restore flip-flop 101 is normally in its reset condition. Therefore, one input of each of the write gates is primed. The address of the first memory plane of the group 14 is decoded by the decoder 111 to raise the voltage level at the second input of the write gate 102. Therefore, the write gate 102 is fully primed by the two input signals, one at the "0" output of the restore flip-flop 101, and the other from the decoder 111. At the time $t_3$, the logic control unit 115 also furnishes an operating signal on the lead 110 and the write gate 102 is operated. The voltage drop across the primary winding 94 of the first transformer 93 induces a voltage in its secondary winding 95 and causes the positive, inhibit pulse 68 to flow in the read-write winding 96 of the first memory plane 12 of the group 14. At the time $t_4$, when the positive, inhibit pulses 68 and 70 have reached a steady value, the operating potential is removed from the matrix switch 22. The driven switch core is returned to the one direction of saturation by the bias potential and the switch pulse 64 flows in the coupled switch winding 28. The respective inhibit pulses 68 and 70 prevent the switch pulse 64 from altering the state of any of the memory cores 20. Therefore, a binary one remains stored in the selected memory core 20 of the first one of the arrays 12 of the group 14.

When it is desired to write a binary zero into any selected memory core 20, an operating signal is furnished via the conductor 18 and the "or" gate 113 to the set input of the restore flip-flop 101. The voltage level of the "1" output side of the restore flip-flop is raised and the voltage level of the "0" output side is lowered. Therefore, none of the write gates is primed and the operating signal furnished at the time $t_3$ to the write gates is blocked. Consequently, the switch pulse 64 changes the state of the selected memory core 20 from the state P to the state N thereby writing a binary zero in the selected memory core. The read-out cycle is similar to the write cycle and is as follows: When a binary one is stored in the interrogated memory core 20, the substantially zero amplitude, voltage pulse 74 is induced in the coupled read-write winding 96. The amplitude of the pulse 74 is insufficient to change the magnetization of the "or" gate 97. Therefore, no output voltage is induced in its output winding 98 and the restore flip-flop 101 remains in its reset condition with a relatively high level voltage on its "0" output. Accordingly, the one write gate corresponding to the selected memory plane 12 is fully primed and a positive inhibit pulse is applied to the read-write winding 96 preventing the switch pulse 64 from changing the state of the interrogated memory core. Thus, the binary one remains stored in the interrogated memory core 20.

When a binary zero is stored in the selected memory core 20, the relatively large amplitude, voltage pulse 72 is induced in the coupled read-write winding 96. The pulse 74 is of a sufficient amplitude to change the magnetization of the "or" gate 97. Therefore, a voltage is induced in its output winding 98 which voltage is amplified by the amplifier 99 and passed through the "or" gate 113 to the set input of the restore flip-flop 101 raising the voltage level on its "1" output. Consequently, none of the write gates is primed and the inhibit pulse 70 is not induced in the coupled read-write winding 96. Thus, a binary zero is written back into the interrogated memory core 20 by the switch pulse 64 which restores the interrogated core to the state N.

In the system of Fig. 5, cross-talk between the memory planes 12 of a group is circumvented by designing the "or" gate 97 to have insufficient magnetic material to pass an appreciable power signal. Therefore, the transient voltages induced in the remaining three secondary windings 95, due to the common magnetic circuit 97, when a driving voltage is applied to the primary winding 94 of the fourth transformer, die out before the switch pulse 64 is applied to the switch winding 28. Complete cancellation of such cross-talk may be achieved by using, instead of a magnetic circuit having a linear magnetization characteristic, a core comprised of rectangular hysteresis loop magnetic material. In such case, the "rectangular" core is a "one-bit" register and is reset after each interrogation of a memory plane group. A similar one-bit register is described in Patent No. 2,691,156 entitled "Magnetic Memory Reading System," issued to J. Saltz, et al., October 5, 1954.

There has been described herein an improved memory system which has a storage configuration providing greater economy in equipment required for writing information into and reading information out of the system. The present invention distributes a large portion of the logic circuitry required for access among the memory planes. Therefore, a smaller end switch can be provided. The memory system of the present invention essentially approaches the idealized condition of a perfect cubicle array. For example, consider a coincident-current memory having a capacity of 4096, seven binary digit words, using cascaded end switches, for access to a given word. The 64×64 switch matrix is driven by 2×64=128 amplifiers. An individual inhibit amplifier for each memory plane is also required. Thus, at best, it is seen that this memory requires the 128 amplifiers of the switch, plus seven different, inhibit amplifiers, or a total of 135 amplifiers. In the memory system described in Fig. 1 herein, and again assuming a direct access to the end switch, the amplifier requirements are reduced. Thus, only 2×32=64 amplifiers are required for the end switch. Four different amplifiers are required for providing the positive, inhibit pulse, and four other amplifiers are required for producing the negative, inhibit pulse. However, the inhibit amplifiers are constant in number regardless of the word length. In addition, the present invention requires an individual, inhibit amplifier for each digit plane for impressing the positive, inhibit currents on an individual plane. Thus, for a word of 7 binary digits, 7×4=28 individual, inhibit amplifiers are required. Consequently, in the present invention, the total amplifier requirement for a memory capacity of 4096 words, each having 7 binary digits, is only 100, i.e. 64+8+28=100.

The arrangement of Fig. 1, however, can be made to resemble a perfect cubicle memory. In such case, a 16×16 end switch is provided. This end switch is driven by 2×16=32 amplifiers. There are sixteen memory planes provided in each group. The input logic is then as follows: four binary digits are used for selecting a switch column, four binary digits used for selecting a switch row, and four binary digits are used for selecting one-out-of-sixteen memory planes in each group. Accordingly, the memory system of the present invention provides an arrangement whereby the number of switch windings for a given capacity is reduced by a factor of four, thereby substantially reducing the mechanical complexity and the number of driving amplifiers. In addition, improved means are provided for combining the read-out winding and inhibit winding of a memory plane into a single read-write winding. A simple, magnetic means is also provided for sensing an output from any one of a group of the memory planes without cross-talk between the read-write windings of a group.

What is claimed is:

1. A memory system comprising groups of three-dimensional arrays of bistable elements, each of said groups having a plurality of two-dimensional arrays of said elements, each said two-dimensional array including a plurality of said elements, switch means for selecting a desired one of said elements in each two-dimensional array in each of said groups, logic circuitry for selecting at the same time a desired one of said two-dimensional arrays in each of said groups, and means for selectively writing information into and reading information out of said selected element of each of said selected two-dimensional arrays.

2. A memory system comprising a plurality of first arrays of bistable elements, each first array including a plurality of said elements, said first arrays being arranged in groups to form a multi-dimensional array, each group including a like number of said first arrays, switch means for selecting a desired one of said elements in each one of said first arrays, logic circuitry for selecting at the same time a desired one of said first arrays in each of said groups, and means for selectively writing information into and reading information out of said selected element of said selected first array in each of said groups.

3. A memory system as recited in claim 1 wherein said bistable elements comprise magnetic cores, each of said cores being characterized by a substantially rectangular hysteresis loop.

4. A memory system comprising a plurality of bistable elements, and means selectively to apply excitation in one sense to a selected one of said elements sufficient to drive it from one stable state to another, said means comprising means to apply one excitation to one or more of said elements including said selected one, and means to apply to certain of said one or more elements, another excitation initiated before and terminated after said one excitation.

5. A memory system comprising a plurality of bistable elements, said elements being individually identifiable as corresponding to the elements of an array arranged in rows and columns, means to apply an excitation to a desired element different from that applied to others of said elements comprising a plurality of first excitation means each coupled to all the elements corresponding to at least one row of said array, a plurality of second excitation means each coupled to all the elements corresponding to at least one column of said array, means to apply one excitation to one of said first excitation means coupled to said desired element, and means to apply to one of said second excitation means coupled to said desired element another excitation initiated before and terminated after said one excitation.

6. A memory system comprising cores of rectangular hysteresis loop material arranged in an array having rows and columns, and means to apply a magnetizing force to any selected core different from that applied to any other comprising a plurality of row windings each coupled to a different set of row cores, a plurality of column windings each coupled to a different set of column cores, means to apply one excitation to one of said row windings coupled to said selected core, and means to apply to those of said column windings that are coupled to the other cores of the set including said selected core another excitation initiated before and terminated after said one excitation.

7. A memory system comprising a plurality of bistable elements and means for reading information stored in said system, said means including, a plurality of first excitation means each individual to one of said elements, a second excitation means coupled to every one of said elements, means to apply selectively a first excitation to one of said first excitation means, and means to apply selectively to said second excitation means another excitation initiated before and terminated after said one excitation.

8. A memory system comprising cores of rectangular hysteresis loop material arranged in an array and means for reading information stored in said system, said means including, means to apply a magnetizing force to any selected core different from that applied to any other comprising a plurality of windings each individual to one core, a different winding coupled to all the cores of the array, means to apply one excitation to the one of said plurality of windings which is coupled to said selected core, and means to apply selectively to said different winding another excitation initiated before and terminated after said one excitation.

9. A memory system as recited in claim 8 wherein the initiation of said one excitation and the termination of said other excitation are respectively delayed for a time required for the disturbing voltages generated by the non-selected cores to die out.

10. In a memory system having groups of three-dimensional arrays of bistable elements, each of said groups having a number "$p$" of two-dimensional arrays of said elements, each two-dimensional array including a plurality of said elements, means for selecting a desired one of said elements in a given memory position in each of said groups comprising means for initiating a first pulse, means for initiating a second pulse, said second pulse being initiated before and terminated after said first pulse, means for applying said second pulse to every element in $(p-1)$ arrays of each group, and means for applying said first pulse to every element in said given memory position thereby to select said desired element in the given memory position in each group.

11. In a memory system having groups of three-dimensional arrays of bistable elements, each of said groups having a number "p" of two-dimensional arrays of said elements, each two-dimensional array including a plurality of said elements, means for selecting a desired one of said elements in a given memory position in each of said groups comprising means for initiating a waveform comprising a first pulse of one polarity followed after a predetermined time by a second pulse of the opposite polarity, means for initiating a third pulse of the opposite polarity and a fourth pulse of the one polarity, said third and fourth pulses being initiated before and terminated after said first and second pulses respectively, means for applying said waveform to every element at said memory position, means for applying said third pulse to every element in $(p-1)$ of said arrays in each group thereby preventing said first pulse from altering the state of the storage element in said $(p-1)$ arrays, means for applying said fourth pulse to every storage element in $(p-1)$ of said arrays in each group thereby preventing said second pulse from altering the state of the storage elements in said $(p-1)$ arrays, means for initiating a fifth pulse of the one polarity, said fifth pulse being initiated before and terminated after said second pulse, means for applying said fifth pulse to the $p$th array of selected ones of said groups.

12. A memory system comprising groups of three-dimensional arrays of bistable storage elements, each of said groups having "p" two-dimensional arrays of said elements, each two-dimensional array including a plurality of said elements, a plurality of switch windings, a plurality of read-write windings and a plurality of inhibit windings, means coupling an individual one of said switch windings to every element in a given memory position, means coupling an individual read-write winding to every element in one of said two-dimensional arrays, means coupling an individual inhibit winding to every element in one of said two-dimensional arrays, and means for selectively writing information into and reading information out of a desired element in selected ones of said two-dimensional arrays.

13. A memory system as recited in claim 12 wherein the writing of information into said desired elements comprises means for initiating a first inhibit pulse, means for initiating a waveform comprising a first switch pulse of one polarity and a second switch pulse of the opposite polarity, means for initiating a second inhibit pulse, means for applying said first inhibit pulse to the inhibit winding of $(p-1)$ arrays of each group, means for applying said waveform to every element corresponding to the memory position of said desired elements, said first inhibit pulse and said first pulse of said waveform occurring concurrently, means for applying said second inhibit pulse to the inhibit winding of $(p-1)$ arrays of each group and to selected ones of the $p$th arrays of each group, said second inhibit pulse and said second pulse of said waveform occurring concurrently.

14. In a memory system comprising groups of three-dimensional arrays of bistable elements, each of said groups having a plurality of two-dimensional arrays, a plurality of windings each individually coupled to every element in a different two-dimensional array, a magnetic core to which each of said windings is coupled, and an output winding linking said core.

15. In a memory system in accordance with claim 14, said magnetic core being comprised of a material having a linear magnetization characteristic.

16. In a memory system comprising at least one group of three-dimensional arrays of bistable elements, each of said groups having a plurality of two-dimensional arrays of magnetic cores, each of said arrays having a read-write winding coupled to every core, a plurality of pulse transformers each having a primary and a secondary winding, means connecting one terminal of the secondary winding of an individual one of each of said pulse transformers to one terminal of a read-write winding, a magnetic core to which is coupled the other terminal of each of said secondary windings, and means connecting an individual pulse source across each of said primary windings.

17. In a memory system in accordance with claim 16, each of said magnetic cores being comprised of material having a linear magnetization characteristic.

18. In a memory system having a plurality of magnetic elements, of substantially rectangular hysteresis loop material, and means for reading information stored in a selected one of said plurality of elements comprising means for applying one excitation to a plurality of said elements including said selected one element, and means for applying to the remaining ones of said plurality of elements another excitation initiated after the initiation of said one excitation and coincident in time with at least a portion at said one excitation.

19. In a memory system having a plurality of magnetic memory elements of substantially rectangular hysteresis loop material, and means for reading information stored in a desired one of said elements comprising means for applying one excitation to certain of said elements including said desired element, and means for applying an inhibiting, other excitation to the remaining ones of said certain elements, said other excitation being initiated before said first excitation.

20. In a memory system having at least two magnetic cores of substantially rectangular hysteresis loop material, and means for reading information stored in said cores comprising means for applying one excitation to both of said cores, and means to apply to one of said cores another excitation initiated before said one excitation and coincident at least in part with said one excitation.

21. In a memory system having at least two magnetic cores, each having a rectangular hysteresis characteristic, and means for reading information stored in said cores comprising means for applying one excitation to both of said cores, and means to apply to one of said cores another excitation initiated before said one excitation and coincident at least in part with said one excitation.

References Cited in the file of this patent

UNITED STATES PATENTS

| | | |
|---|---|---|
| 2,709,248 | Rosenberg | May 24, 1955 |
| 2,734,182 | Rajchman | Feb. 7, 1956 |
| 2,736,880 | Forrester | Feb. 28, 1956 |
| 2,784,391 | Rajchman et al. | Mar. 5, 1957 |

OTHER REFERENCES

Thesis by M. K. Haynes, Dec. 28, 1950, pp. 21–28.

"The 16×16 Metallic-Core Memory Array, Model I" by B. Widrowitz, "Digital Computer Laboratory MIT." Report R–216, Sept. 25, 1952, p. 63, relied upon.

Proc. of the Eastern Joint Computer Conference of December 8–10, 1953, pp. 37–42.